United States Patent [19]
Sargeant et al.

[11] Patent Number: 6,120,900
[45] Date of Patent: Sep. 19, 2000

[54] LIQUID ABSORBENT MATERIAL

[75] Inventors: Steven J. Sargeant, West Warwick; Shengmei Yuan, Coventry; Joshua Rundus, West Warwick, all of R.I.

[73] Assignee: Arkwright Incorporated, Fiskeville, R.I.

[21] Appl. No.: 09/003,329

[22] Filed: Jan. 6, 1998

[51] Int. Cl.[7] .................................................... B32B 27/36
[52] U.S. Cl. ............................ 428/412; 428/216; 428/330
[58] Field of Search ..................................... 428/216, 195, 428/330, 331, 342, 412, 413

[56] References Cited

U.S. PATENT DOCUMENTS

| | | | |
|---|---|---|---|
| 4,528,242 | 7/1985 | Burwasser | 428/413 |
| 5,192,617 | 3/1993 | Stofko, Jr. et al. | 428/411.1 |
| 5,219,928 | 6/1993 | Stofko, Jr. et al. | 525/57 |
| 5,439,739 | 8/1995 | Furukawa et al. | 428/341 |

FOREIGN PATENT DOCUMENTS

| | | |
|---|---|---|
| 0566270A1 | 10/1993 | European Pat. Off. . |
| WO 9749561 | 12/1997 | WIPO . |

OTHER PUBLICATIONS

Patent Abstracts of Japan, 08 067065, Mar. 12, 1996, European Patent Office.
Patent Abstracts of Japan, 01 207375, Aug. 21, 1989, European Patent Office.
Patent Abstracts of Japan, 07 125410, May 16, 1995, European Patent Office.

*Primary Examiner*—Terressa M. Boykin
*Attorney, Agent, or Firm*—Birch, Stewart, Kolasch & Birch, LLP

[57] ABSTRACT

A water-insoluble liquid-absorbent material comprising a cross-linked matrix containing a polymer having at least two cross-linkable functional end groups and substantially free of cross-linking functional groups elsewhere within the polymer that are crosslinked with a cross-linking agent having a functionality greater than two, and in combination therewith, a dye-fixing agent having at least one reactive functional group. An ink jet recording medium having a coating of the water-insoluble liquid-absorbent material on a surface thereof is also provided.

8 Claims, No Drawings

LIQUID ABSORBENT MATERIAL

FIELD OF THE INVENTION

The present invention relates to a water-insoluble material that is capable of absorbing liquids. More particularly, it relates to a material that is suitable for use as an ink-receptive coating layer in an ink jet film.

BACKGROUND OF THE INVENTION

The use of cross-linked polymeric material in ink jet receiving films is a well-known technology. Common cross-linking mechanisms involve exploiting functional group chemistry within the polymer backbone. This type of cross-linking is commonly used to give water insolubility to the coated product.

U.S. Pat. No. 5,219,928 discloses a liquid-absorbent composition comprising (a) a polymeric matrix component comprising cross-linked silanol moieties, said silanol moieties being in pendant groups of said matrix component, and (b) an uncross-linked liquid-absorbent component comprising at least one water-absorbent polymer.

U.S. Pat. No. 5,439,739 discloses an ink jet recording medium comprising a support and at least one ink jet receiving layer, said ink receiving layer comprising a water-soluble polymer obtained by copolymerizing 10–50 parts by weight of a quaternary salt monomer, 1–30 parts by weight of an amino group containing monomer or a carboxyl group containing monomer and 20–80 parts by weight of a monomer selected from acrylamide, methacrylamide, N,N-dimethacrylamide, N-isopropylacrylamide, diacetone acrylamide, N-methylolacrylamide, 2-hydroxyethyl(meth) acrylate, and N-vinylpyrrolidone, and 0.1–30 parts by weight of a cross-linking agent.

U.S. Pat. No. 5,192,617 discloses a transparent film comprising a transparent backing bearing on at least one major surface thereof a layer formed from a composition comprising (a) a polymeric matrix component comprising cross-linked tertiary amino moieties and carboxyl moieties, said matrix component having one carboxyl moiety for each amino moiety that has been cross-linked, and (b) a liquid absorbent component comprising a water-absorbent polymer that is not cross-linked.

U.S. Pat. No. 4,528,242 discloses an ink jet recording transparency having a coating which is clear and comprises a mixture of a carboxylated polymer or copolymer, having a molecular weight of about 50,000 to 1 million, and a polyalkylene glycol having an average molecular weight of about 5,00 to 25,000, preferably 15,000 to 25,000, the glycol being present in an amount of about 5% to 70%, preferably 10% to 25%, by weight of said polymer.

Traditional cross-linking through functional groups within the backbone of the polymer results in a dense, tightly packed product. Although it is not difficult to make such a material water insoluble, it is difficult to obtain liquid receptivity with such a technique. In particular, the ability of such a material to absorb liquid ink is often compromised. Ink jet coatings produced with such materials are often unable to accept very high ink loadings and images are often of poor quality.

SUMMARY OF THE INVENTION

It is an object of the present invention to produce a novel water-insoluble liquid absorbent material that contains (1) a water-insoluble material obtained by reacting the end groups of a polymer having at least two cross-linkable functional end groups and substantially free of cross-linking functional groups elsewhere within the polymer with a cross-linking agent having a functionality greater than two, and (2) optionally a dye-fixing agent having at least one reactive functional group. The product of this "soft" cross-linking is open and loosely packed and adheres firmly when coated onto a substrate. Such an open structure is useful for the development of unique ink jet recording media having the ability to accept very high ink loading applications. The present liquid absorbent material has many other applications including, but not limited to, adhesives, protective coatings, and lamination layers.

Accordingly, the present invention provides liquid absorbent materials that are optimally transparent and comprise (1) a cross-linked material obtained by cross-linking a polymer having at least two cross-linkable functional end groups and substantially free of cross-linking functional groups elsewhere within the polymer with a cross-linking agent having a functionality greater than two; and (2) optionally a dye-fixing agent having at least one reactive functional group.

Accordingly, the present invention fulfills the need for a high quality water resistant medium which is capable of receiving high ink loading. In order to achieve a high quality ink jet coating that is simultaneously water-insoluble and capable of receiving high ink loading, the ink-receptive coating layer must be cross-linked. In order to render the coating impervious to image degradation by water with dye based inks, a dye fixing agent (e.g., a dye fixing polymer) can be added to the matrix. But with pigment based inks, a dye fixing agent is not required to render the coating impervious to image degradation by water.

The invention also provides ink jet recording media that contain a substrate coated with a layer of the inventive water-insoluble liquid absorbent material.

DETAILED DESCRIPTION

The present invention provides a water-insoluble liquid absorbent material comprising a cross-linked matrix obtained by cross-linking the functional end groups of a polymer having at least two cross-linkable functional end groups and substantially free of cross-linking functional groups elsewhere within the polymer with a cross-linking agent having a functionality greater than two, and optionally providing in combination therewith, a dye-fixing agent having at least one reactive functional group.

In the present invention, water-insoluble liquid-absorbent materials are defined as those that retain their physical integrity after immersion in water for about 24 hours at about 25° C.

Adjusting the functionality of the cross-linking agent controls the cross-linking density of the water-insoluble liquid absorbent material that is formed. The use of a tri-functional cross-linking agent or a tetra-functional cross-linking agent allows for the formation of hyper-branched materials, and ultimately, the formation of an insoluble matrix. Tailoring the use of such branching centers can impart desired properties to the produced water-insoluble liquid absorbent material.

Di-functional cross-linking materials and monofunctional endcapped polymers, on the other hand, may be added to control the total cross-linked network structure. These moieties act to limit the growth of the network structure.

Suitable di-functional end groups contained within the polymer are hydroxy end groups, carboxylic acid end groups, and amine end groups. The polymer may be selected from the group consisting of polyethylene glycol, polypropylene glycol, polytetrahydrofuran, diacids, amine-terminated propylene glycol oligomers, and the like. Preferably, the polymer does not contain cross-linkable functional groups within or on the backbone thereof, in order to avoid producing a tightly packed structure like that associated with conventional cross-linking schemes.

Suitable cross-linking agents may be selected from the group consisting of melamines, carbodiimides, epoxides, aziridines, and oxazoline containing grafted co-polymers.

Suitable dye fixing agents are selected from the group consisting of amines and quaternary amines.

In order to help illustrate the basis of the instant invention, the following differences are noted between conventional cross-linking schemes and the Inventors' cross-linking scheme that is used in preparing the instant liquid absorbent materials.

The conventional reaction scheme shown below provides a representation of a tightly packed structure achieved by traditional cross-linking through functional groups within the backbone of the polymer. This type of structure is achieved by reacting the polyfunctional polymer, 1, with functional groups located within the backbone of the polymer chain, with the di-functional cross-linking agent, 2, or the tri-functional cross-linking agent, 3, to give the tightly packed structure, 4. It is difficult to obtain liquid receptivity with such a structure. Ink jet film coatings produced with such materials are often unable to accept very high ink applications and images are often of poor quality.

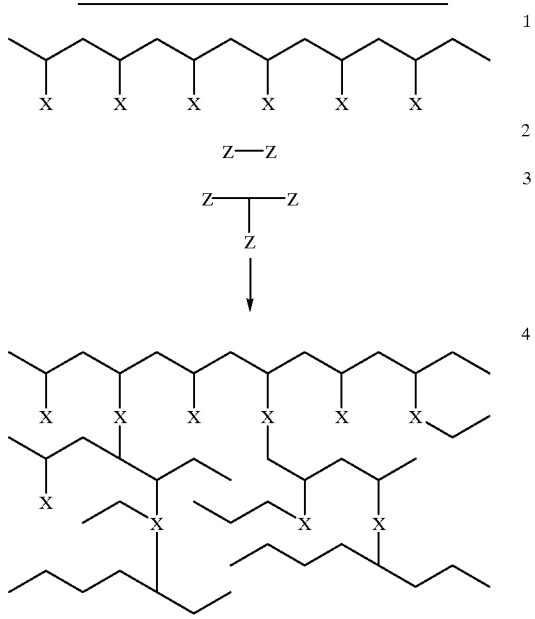

In contrast, the Inventors' Cross-linking Scheme, shown below, provides a loosely packed structure by cross-linking a polymer having at least two cross-linkable functional end groups and substantially free of cross-linking functional groups elsewhere within the polymer. Specifically, the polymer having at least two cross-linkable functional end groups, 5, is reacted with the cross-linking agent having a functionality greater than two, 6, to give the loosely packed structure, 7. Such an open structure provides for superior liquid absorbency and is particularly useful for the development of unique ink jet recording media having the ability to accept very high ink loadings.

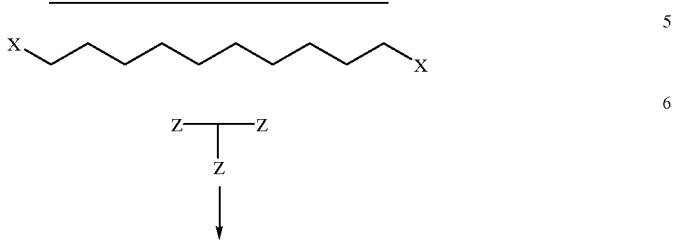

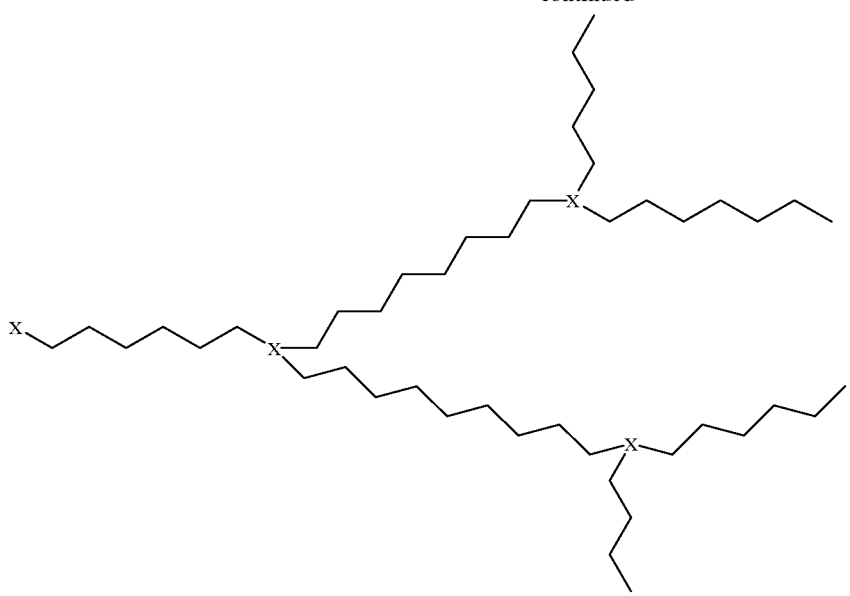

The addition of non-reactive diluents into the water-insoluble liquid-absorbent materials can impart desired properties into prepared end products such as ink jet films. For example, certain materials such as polyacrylamides, polyethylene oxides, polypropylene oxides, polyphenylene oxides, polyvinylpyrollidones, and polyoxazolines can be utilized to increase water absorption.

Also, the use of multi-functional extender materials in the water-insoluble liquid-absorbent material increases the networking or cross-linking density of the final material, such that their use is also encompassed by the invention. Exemplary extender materials include glycerol, sorbitol, ethylenediamine-tetraacetic acid, phthalic anhydride, polyvinyl alcohol, polyvinylimine, polyalkylamines, and the like.

In a preferred embodiment, an ink jet recording medium is prepared with the liquid-absorbent material of the present invention as follows.

A polymer having at least two cross-linkable functional end groups and substantially free of cross-linking functional groups elsewhere within the polymer is combined with a cross-linking agent having a functionality greater than two. A dye-fixing agent having at least one reactive functional group is added to the cross-linked polymer. The mixture, when dried of solvent, forms an ink-receptive coating material for an ink jet recording medium.

The resultant ink-receptive coating material is coated onto a substrate such as polyethylene terephthalate, polyethylene subbed paper, clay-coated papers, and the like, to form an ink jet recording medium having excellent ink absorbency and dye-fixing quality.

Coating can be conducted by any suitable means including roller coating, extrusion coating, wire-bar coating, dip-coating, rod coating, doctor coating, or gravure coating. Such techniques are well known in the art.

In order to illustrate more fully the various embodiments of the liquid absorbent materials of the present invention, the following non-limiting examples are provided. In the following examples, the term "parts" means "parts by weight", unless otherwise specified.

EXAMPLE 1

| | |
|---|---|
| 10 parts | CARBOWAX 20M[1] |
| 2 parts | CYMEL 325[2] |
| 0.5 parts | ammonium salicilate |
| 80 parts | water |
| 10 parts | methanol |
| 0.5 parts | FLOURAD FC-430[3] |

[1]Oligomeric Polyethylene glycol, hydroxy terminated, sold by Union Carbide.
[2]Melamine cross-linking agent, polyfunctional, sold by Cytek Industries.
[3]Fluoro-surfactant sold by 3M Company.

This mixture was coated onto a polyethylene terephthalate substrate using a number 50 wire wound bar and dried in a forced air oven at 150° C. for 10 minutes. The film formed was ink absorbent and substantially dye fixing.

EXAMPLE 2

| | |
|---|---|
| 10 parts | CARBOWAX 20M[1] |
| 2 parts | CYMEL 325[2] |
| 0.5 parts | ammonium salicilate |
| 80 parts | water |
| 10 parts | methanol |
| 4 parts | SYNTRAN HX-3144[3] quaternary ammonium resin |

[1]Oligomeic Polyethylene glycol, hydroxy terminated, sold by Union Carbide.
[2]Melamine cross-linking agent, polyfunctional, sold by Cytek Industries.
[3]Cationic copolymer sold by Interpolymer, Incorporated.

This mixture was coated onto a polyethylene terephthalate substrate using a number 50 wire wound bar and dried into a forced air oven at 150° C. for 10 minutes. The film formed was ink absorbent and substantially dye fixing.

EXAMPLE 3

| | |
|---|---|
| 10 parts | JEFFAMINE 405[1] |
| 3 parts | HELOXY modifier 48[2] |
| 0.5 parts | ammonium salicilate |
| 80 parts | water |

[1]Amine terminated, propylene glycol oligomer sold by Huntsman Chemical.
[2]Epoxy cross-linking agent sold by Shell Chemical.

This mixture was coated onto a polyethylene terephthalate substrate using a number 50 wire wound bar and dried into a forced air oven at 150° C. for 10 minutes. The film formed was ink absorbent and substantially dye fixing.

EXAMPLE 4

| | |
|---|---|
| 10 parts | CARBOWAX 20M Flaked[1] |
| 2 parts | CYMEL 325[2] |
| 0.5 parts | ammonium salicilate |
| 80 parts | water |
| 10 parts | methanol |
| 6 parts | SURCOL SP6[3] |

[1]Oligomeric Polyethylene glycol, hydroxy terminated, sold by Union Carbide.
[2]Melamine cross-linking agent, polyfunctional, sold by Cytek Industries.
[3]Hydrophilic polymer solution (50 wt% solids), sold by Allied Colloids Inc.

This formula was applied to a polyethylene terephthalate substrate using a No. 50 rod, and then dried at 150° C. for 10 minutes, to provide a clear coating that printed well. The film formed was ink absorbent and substantially dye fixing.

EXAMPLE 5

| | |
|---|---|
| 10 parts | CARBOWAX 20M Flaked[1] |
| 2 parts | CYMEL 325[2] |
| 0.5 parts | ammonium salicilate |
| 80 parts | water |
| 10 parts | methanol |
| 4 parts | GAFquat 734 (50% solids)[3] |

[1]Oligomeric Polyethylene glycol, hydroxy terminated, sold by Union Carbide.
[2]Melamine cross-linking agent, polyfunctional, sold by Cytek Industries.
[3]Polyquaternium-11, sold by Rhone-Poulenc Surf.

This formula was applied to a polyethylene terephthalate substrate using a No. 50 rod, and then dried at 150° C. for 10 minutes, to provide a hazy coating that printed well. The film formed was ink absorbent and substantially dye fixing.

EXAMPLE 6

| | |
|---|---|
| 10 parts | CARBQWAX 20M Flaked[1] |
| 2 parts | CYMEL 325[2] |
| 0.5 parts | ammonium salicilate |
| 80 parts | water |
| 10 parts | methanol |
| 4 parts | PEG 400[3] |

[1]Oligomeric Polyethylene glycol, hydroxy terminated, sold by Union Carbide.
[2]Melamine crosslinking agent, polyfunctional, sold by Cytek Industries.
[3]Polyethylene Glycol.

This formula was applied to a polyethylene terephthalate substrate using a No. 50 rod, and was dried at a temperature of 150° C. for 10 minutes. This example did not dry as well on the substrate and the coating layer possessed some voids therein, due to the high molecular weight PEG utilized.

Various modifications and alterations of this invention will become apparent to those skilled in the are without departing from the scope and spirit of this invention, and it should be understood that this invention is not to be unduly limited to the illustrative embodiments set forth herein.

What is claimed is:

1. A water-insoluble liquid-absorbent material comprising:
    a polymer selected from the group consisting of polyethylene glycol, polypropylene glycol and amine-terminated propylene glycol oligomers;
    a cross-linking agent having a functionality greater than two selected from the group consisting of melamines, carbodiimides, epoxides, aziridines and oxazoline containing grafted co-polymers; and
    optionally a dye-fixing agent having at least one reactive functional group.

2. The liquid-absorbent material according to claim 1, wherein said dye-fixing agent is selected from the group consisting of non-quaternary amines and quaternary amines.

3. The liquid-absorbent material according to claim 1, further comprising a multifunctional extender material.

4. The liquid-absorbent material according to claim 3, wherein said multifunctional extender material is selected from the group consisting of glycerol, sorbitol, ethylenediaminetetraacetic acid, phthalic anhydride, polyvinyl alcohol, polyvinylimine, and polyalkylamine.

5. An ink jet recording medium, comprising:
    a substrate, and
    a coating on the substrate, which coating comprises a water-insoluble liquid-absorbent material containing:
    a polymer selected from the group consisting of polyethylene glycol, polypropylene glycol and amine-terminated propylene glycol oligomers;
    a cross-linking agent having a functionality greater than two selected from the group consisting of melamines, carbodiimides, epoxides, aziridines and oxazoline containing grafted co-polymers; and
    optionally a dye-fixing agent having at least one reactive functional group.

6. The ink jet recording media of claim 5, wherein said dye-fixing agent is selected from the group consisting of non-quaternary amines and quaternary amines.

7. The ink jet recording media of claim 5, wherein said coating further comprises a multi-functional extender material.

8. The ink jet recording media of claim 7, wherein said multifunctional extender material is selected from the group consisting of glycerol, sorbitol, ethylenediaminetetraacetic acid, phthalic anhydride, polyvinyl alcohol, polyvinylimine, and polyalkylamine.

* * * * *